March 8, 1938.    C. W. PLACE    2,110,714
AUTOMATIC CONTROL SYSTEM
Filed Dec. 4, 1936
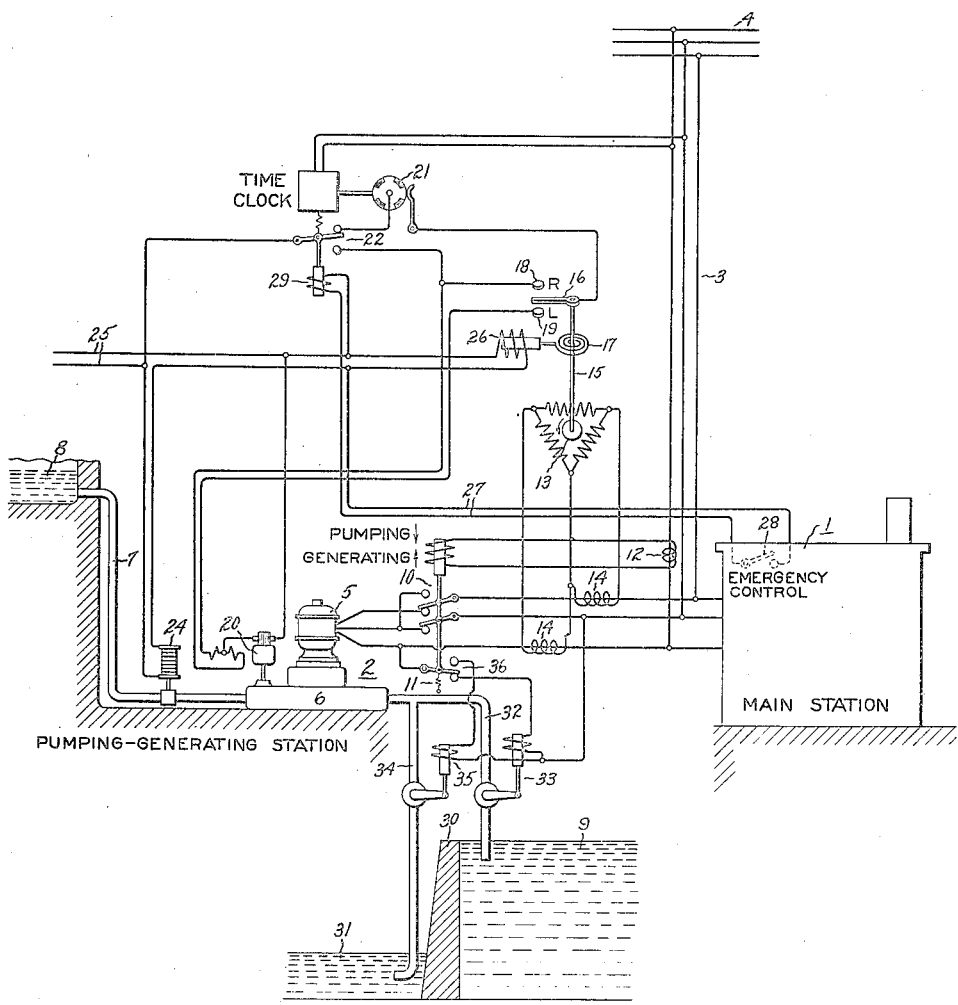
Inventor:
Claude W. Place,
by Harry E. Dunham
His Attorney.

Patented Mar. 8, 1938

2,110,714

UNITED STATES PATENT OFFICE 2,110,714

AUTOMATIC CONTROL SYSTEM

Claude W. Place, La Grange, Ill., assignor to General Electric Company, a corporation of New York Application December 4, 1936, Serial No. 114,233

12 Claims. (Cl. 290—4)

My invention relates to automatic control systems, and more particularly to a system for automatically controlling and regulating the operation of a pumping-generating station.

A pumping-generating station consists essentially of a dynamo electric machine which can selectively be operated either as a motor or as a generator coupled to a hydraulic machine which can be operated either as a pump or as a turbine. Such stations are operated in conjunction with main power generating systems and they function to pump water to a storage reservoir during times of relatively light load on the main system and to draw water from the reservoir and generate power hydroelectrically at times of relatively heavy load on the main system. In other words, a pumping-generating station is an energy storing device whereby during light loads on a main system, energy may be stored for use in helping out the system during peak load times. Heretofore, pumping-generating stations have been manually controlled and have been wasteful of both water and electrical power.

In accordance with my invention, I provide an automatic control system for a pumping-generating station which operates the station at substantially its point of most efficient operation both pumping and generating. This is done by automatically regulating the power input and output of the station. In addition, there is provided time controlled means for automatically obtaining maximum output from the station during the times of extreme peak load on the main system. Other features are insured energizing control of maximum station output and utilization of a two level low level reservoir for improving the economy and efficiency of operation of the system.

An object of my invention is to provide a new and improved control system.

Another object of my invention is to provide an automatic control and regulating system for pumping-generating stations.

My invention will be better understood from the following description taken in connection with the accompanying drawing, and its scope will be pointed out in the appended claims.

Referring now to the single figure of the accompanying drawing, I have shown therein diagrammatically an embodiment of my invention wherein a main electric power generating station 1 is operated in conjunction with a pumping generating station 2. The main generating station 1 is connected by means of a transmission line 3 to a distribution system 4 for distributing the generated electrical power to any suitable community or communities of electric power consumers.

The pumping-generating station 2, which draws energy from the main station during light load periods and which supplies energy to the main station during heavy load conditions on the main station, consists of a unitary motor-generator 5 and a unitary pump-turbine 6. By means of a pipe 7 the pump-turbine 6 is connected hydraulically between a high-level reservoir 8 and a low-level reservoir, stream or river 9.

As the direction of flow of water in the pipe 7 reverses when the pumping-generating station goes from pumping to generating, it is necessary for the pump-turbine 6 to reverse and therefore the direction of rotation of the unitary motor-generator 5 must reverse. In order to accomplish this automatically, I provide an electromagnetically operated phase-rotation reversing switch 10 connected to respond to a function of the power flow in the transmission line 3. As shown, the switch is biased by means of a spring 11 to a closed position for energizing the motor-generator 5 so that it rotates in the direction to cause device 6 to act as a pump. The operating winding of switch 10 is connected by means of a current transformer 12 in one of the conductors of the line 3. When the power output of the main station or the load on the transmission line 3 exceeds a predetermined value, the switch 10 moves to its upper position thereby reversing two of the line-conductor connections to the motor-generator 5 whereby its direction of rotation is reversed so that the auxiliary station can act as a generating station.

In order not to waste power, I provide automatic means for regulating the input and output of the pumping-generating station so that it operates substantially at its point of maximum efficiency both pumping and generating. This means consists of a load-responsive device in the form of a three-phase torque motor 13, two of the phase windings of which are connected to respond respectively to the current of two of the line conductors of the three-phase circuit between the main station and the unitary motor generator 5. The connections are preferably made by means of current transformers 14. This is the equivalent of an open-delta current-responsive connection of the torque motor and the torque motor produces a torque proportional to the current flow between the main station and the pumping-generating station. As most commercial power systems are substantially constant-voltage systems and as the power factor of the unitary motor-generator remains substantially constant during its operation, it will be appreciated that the current flow between these units is substantially directly proportional to the power flow between them.

An advantage of such an arrangement is that the direction of the torque of the torque motor is independent of the direction of power interchange between the main station and the pumping-generating station. This is because a reversal of current in the line connecting these units does not reverse the phase rotation. As shown by the arrow on the torque motor, the torque produced by this device is in a counter-clockwise direction. The torque motor is connected by means of a shaft 15 to a movable contact member 16 and the shaft is biased in a clockwise direction by means of a spring 17. The movable contact 16 is arranged for selective engagement with a raise contact 18 and a lower contact 19. Reversing connections are made between the raise and lower contacts 18 and 19 and a small servo motor 20 which may be the synchronizing motor for the pumping-generating station or may be a motor for controlling the gate opening of the pump-turbine unit. The movable contact 16 is connected to the common terminal of the motor 20 through a pair of devices 21 and 22, the functions of which are described immediately below, and through a supply circuit 25.

In order to prevent hunting or over-shooting of the load regulator, which would result in power surges between the main station and the pumping-generating station, an interrupter 21 is interposed in the connection between the movable contact 16 and the common terminal of the motor 20.

In order to insure that maximum electrical output may be obtained from the pumping-generating station at times of maximum peak load on the main system, the supply circuit 25 is arranged to be disconnected from the movable contact 16 and connected directly to the raise contact 18 by means of a switch 22.

Both the interrupter 21 and switch 22 may conveniently be driven by the same timing mechanism or time clock. One suitable form is a small synchronous-motor-operated timer. Such a device may be connected to be energized by the main circuit 3 because the frequency of most central generating stations is now regulated very closely for the purpose of permitting clocks to be driven by synchronous motors energized from such stations.

The motor 20 is energized from any suitable source of control current such as the control bus 25.

As the efficiency vs. horse-power curve of a pumping-generating station varies, among other things, with the head on the pump-generator, there may also be provided suitable means for changing the setting of the regulator in accordance with the head on the pump-generator. One form of such arrangement may consist of a pressure-responsive resistor, such as a carbon pile 24, whose compression may be made dependent upon the hydraulic head in the pipe column 7 by connecting it mechanically to a flexible diaphragm in the pipe 7. The resistor 24 is electrically connected to an electromagnet 26 having a solenoid core connected to one end of the spring 17. The circuit including the magnet winding 26 and resistance 24 is energized from the control circuit 25.

The operation of the illustrated embodiment of my invention, as thus far described, is as follows:

Assume the main station 1 is in operation and is supplying power at rated voltage to the distribution system 4 over the transmission line 3. With the various parts in the positions shown in the drawing, the switch 10 is in its pumping position, thereby indicating that the load on the main station is relatively light. Under these conditions, the dynamo 5 is operating as a motor to drive machine 6 as a pump which is drawing water out of a low-level reservoir 9 and supplying it through the pipe 7 to the high-level storage reservoir 8. The current taken by the motor 5 is just sufficient to cause the torque of the torque motor 13 to balance the counter torque of the spring 17 so as to hold the movable contact 16 in a position intermediate its contact-making positions with raise contact 18 and lower contact 19. By selecting a spring 17 of the proper torque the load on the motor 5 at which the contact 16 is in its mid-position can be made to correspond substantially to the point of maximum efficiency at the normal head for which the pump-turbine 6 is designed.

Pumping-generating stations are usually of the relatively high head type and in such types the change in water level in the relatively high level storage reservoir does not appreciably affect the head against which the pump works. However, in low-head systems or systems where the area of the storage reservoir is relatively small, changes in water level of this reservoir may appreciably affect the head against which the pump operates. Under these circumstances the power input to the motor corresponding to maximum efficiency will vary somewhat with the head. However, changes in head will cause changes in resistance of the compressible resistor 24, thereby changing current in the coil 26, which in turn will change slightly the setting of spring 17, thereby automatically correcting the setting of the regulator for changes in head so that substantially maximum efficiency operation is secured with appreciable variations in head.

Thus, for example, if the torque of spring 17 is relatively stronger than the counter-torque of the torque motor 13, the contact 16 will engage the raise contact 18 thereby completing an operating circuit for motor 20 through the interrupter contacts 21 and the upper contact of switch 22. The motor 20 will rotate in such a direction as to open further the gate or valve for the pump, thereby allowing the pump to do more work and drawing more current through the motor 5. This will increase the torque developed in the torque motor 13 and this action will continue until the torque of the torque motor balances the counter torque of the spring 17 and the contact 16 leaves the raise contact 18. The interrupter insures that this action is intermittent, thus preventing the motor 20 from opening the gate too far, as this would cause the torque motor 13 to over-balance the counter torque of the spring 15 causing the contact 16 to engage the lower contact 19, thereby reversing the motor. Without the interrupter, the reversal of the motor 13 might cause the gate to close too far so as to unload the motor 5 so much that the spring 15 again over-powers the torque motor 13, thereby causing the contact 16 to reengage the contact 18. This hunting action would of course be undesirable.

If, however, the setting of spring 17 is changed so that its strength is relatively weaker than that of the torque motor 13 then the contact 16 does engage the contact 19 whereby the motor 20 will be operated intermittently to cause the pump gate to move toward a closed position. This unloads the pump, thereby reducing the torque of the torque motor 11 until a balance is again restored.

Changes in load on set 2, as contrasted with changes in head thereon, cause the torque of torque motor 13 either to overpower or be overpowered by spring 15. If this causes contact 16 to engage raise or lower contacts 18 or 19, the motor 20 will be operated so as to bring the load back to the efficient point in the manner described above.

If now the load on the main station 1 exceeds a predetermined value, for which the automatic switch 10 is set, this switch will move to the generating position, thereby reversing the phase rotation of the connections between the dynamo 5 and the main station 1 so that the direction of operation of the dynamo can reverse. As water will then flow down from the high level storage reservoir to the low-level reservoir, the pump-turbine 6 will drive the dynamo 5 as a generator, thereby producing electrical power which can flow over the transmission line to the distribution circuit 3 and aid the main generator in carrying relatively heavy loads. It should, of course, be understood that suitable conventional synchronizing means are provided so that when dynamo 5 is operating as a generator, it can safely be connected to the station 1. Such means are old and well-known in the art and as they form no part of the present invention they have not been shown.

As reversal of current in the conductors in which the current transformers 14 are connected does not cause a reversal of phase rotation, the torque of torque motor 13 is independent of the direction of power flow and consequently the automatic regulator will also operate to maintain substantially constant power output of the pumping-generating station when it is generating. Pump-turbines can be produced whose efficiency vs. horse-power curves, both pumping and generating, are substantially the same so that for a single setting of the regulator corresponding substantially to maximum efficiency pumping will also correspond substantially to maximum efficiency generating. The automatic regulator will thus act as before to increase or decrease the opening of the pump-turbine valve or gate so as to hold a value of generated power flow through the unit corresponding substantially to maximum efficiency.

At certain times of the day, such for example, as when darkness approaches, maximum peak loads are applied to main generating stations. Under these conditions, it is desirable to obtain the maximum possible generated output for a pumping-generating station rather than have it operate at its point of maximum efficiency, which point is usually somewhat below the point of maximum output. By means of the time clock, the switch 22 can be made to break the circuit of the common terminal 16 of the load regulation and connect the raise contact 18 directly to the supply circuit 25 at such times. This automatically incapacitates the regulator and causes the turbine gate to go to its full open position so that the pumping-generating station will supply its maximum allowable output.

There may be times, other than those when peak loads are ordinarily applied to the system, which make it desirable to secure maximum electrical power output from the pumping-generating station. For example, short circuit or failure of apparatus in the main station may make it necessary to supplement the output of the crippled main station with as much auxiliary electrical power as can be obtained. To secure this result during such emergencies, I provide an emergency control in the form of a circuit 27 controlled by an emergency control switch 28. This circuit controls the operation of a magnet 29 for operating the switch 22 so that when switch 28 is closed the circuit 27, which is energized from the supply circuit 25, causes the magnet 29 to operate switch 22, thereby incapacitating the load regulator and causing the pumping generating station to operate at its maximum output.

The efficiency of the pumping generating cycle may be increased by having the turbine discharge at a lower level than that from which water is pumped. For example, if the low-level reservoir 9 is formed by placing a dam 30 in a stream 31, then water can be pumped from near the surface of the pond 9 and can be discharged below the dam, thus developing the height of water in the dam at the efficiency and cost of a relatively high head development instead of at the cost and efficiency of a low head development. This operation may be automatically controlled as follows:

A pumping pipe 32 is provided with an electrically operated valve 33 and a discharge pipe 34 is provided with an electrically operable valve 35. These valves are connected in control circuits controlled by a set of auxiliary contacts 36 on main switch 10. With the main switch in the pumping position, as shown in the drawing, the valve 33 will be opened and the valve 35 will be closed so that water will be drawn through the pump 32 from above the dam and near the surface of the pond or reservoir 9. If now the main switch is moved to its generating position, the valve 33 will be closed and the valve 35 will be opened, thereby permitting discharge of water from the turbine through the conduit or pipe 34 to a low level on the down-stream side of the dam 30.

While I have shown and described a particular embodiment of my invention, it will be obvious to those skilled in the art that changes and modifications can be made, and I therefore aim in the appended claims to cover all such changes and modifications as fall within the true spirit and scope of my invention.

What I claim as new and desire to secure by Letters Patent of the United States is:

1. In combination, an electric power system having a main station and a pumping-generating station, and means responsive to an operating condition of said main station for automatically controlling the operation of said pumping-generating station.

2. In combination, an electric power system including a main generating station and a pumping-generating station, and means responsive to the load on said main station for controlling the direction of operation of said pumping generating station.

3. In combination, an electric power system having a main station and a pumping-generating station, and means responsive to the current output of said main station for automatically controlling whether said pumping-generating station pumps or generates.

4. In combination, a power system having a main station and a pumping-generating station, and automatic means responsive to the power flow through said pumping-generating station for holding said power flow substantially constant.

5. In combination, a power system having a main station and a pumping-generating station containing a dynamo, and an automatic load regulator for said pumping-generating station, said regulator including a torque motor connected to respond to the current flow in the dynamo of said pumping-generating station.

6. In combination, an electric power system having a main station and a pumping-generating station, and an automatic load responsive load regulator for said pumping-generating station, said load regulator being set to hold the load on said pumping-generating station at substantially the point of maximum operating efficiency of said pumping-generating station.

7. In combination, a power system having a main station and a pumping-generating station, a regulator for the load on said pumping-generating station, said regulator including a torque motor responsive to a function of the load on said power station and a spring for counter-balancing the torque of said torque motor, said spring being so adjusted that it balances the torque of said torque motor at the value of load corresponding substantially to the point of maximum efficiency of said pumping-generating station for both pumping and generating.

8. In combination, a power system having a main station and a pumping-generating station, a regulator responsive to load on said pumping generating station for raising or lowering the value of said load until it corresponds substantially to the point of maximum operating efficiency of said station, and auxiliary means for incapacitating said regulator and causing said station to generate power at its maximum allowable rate.

9. In combination, a power system including a main station and a pumping-generating station, means for regulating said pumping-generating station to a value of load corresponding substantially to its point of maximum operating efficiency, and time controlled means for incapacitating said regulator and loading said pumping-generating station to its maximum allowable limit.

10. In combination, a power system including main station and a pumping-generating station, regulating means for operating said pumping-generating station at substantially its point of maximum efficiency both pumping and generating, and means responsive to the head of said pumping-generating station for varying the setting of said regulating means.

11. In a pumping generating system, a low level reservoir formed by a dam, a high level storage reservoir, a pump turbine hydraulically connected between said high level reservoir and said low level reservoir, and means for causing said station to pump water from the high level side of the low level reservoir dam and for discharging water on the low side of the low level reservoir dam.

12. In a pumping generating system, a high level reservoir, a low level reservoir, a pump turbine for pumping water from the low level reservoir to the high level storage reservoir, and means for permitting said pump turbine to discharge at a level below the level of the said low level reservoir.

CLAUDE W. PLACE.